July 17, 1956   A. Y. WARNER ET AL   2,754,560
ADJUSTABLE STRAP CONNECTOR
Filed June 17, 1952

INVENTORS
ALDEN Y. WARNER
WILBUR J. CRAVEN
BY OTTO A. BOESEL
JOHN STACHERL
Lindsey and Prutzman
ATTORNEYS

United States Patent Office 2,754,560
Patented July 17, 1956

2,754,560
ADJUSTABLE STRAP CONNECTOR

Alden Y. Warner, Farmington, Wilbur J. Craven, East Hartford, John Stacherl, New Britain, and Otto A. Boesel, Wethersfield, Conn., assignors to The Capewell Manufacturing Company, Hartford, Conn., a corporation of Connecticut Application June 17, 1952, Serial No. 294,016

1 Claim. (Cl. 24—196)

This invention relates to belt or strap connectors and more specifically to an adjustable fastener having particular utility as an adapting linkage for harness webbing and the like wherein the connector is utilized to adjustably secure at least one free end of the harness webbing so as to fit or rig the harness to objects of various shapes and sizes.

The connector of this invention may be incorporated with other devices to great advantage in connection with parachute harness to effect a secure yet adjustable interlock between one portion of the harness and at least one free end of the harness webbing. For example, the present invention may be incorporated in a hook fastener, a D-ring or V-ring connector, in a buckle-like construction, or in a modified buckle construction wherein the connector receives two free ends of the strapping to adjustably and securely link the ends together. The connector of this invention is of the general type disclosed in United States Patent 2,542,044 wherein several exemplary modified structures are illustrated.

Heretofore connectors of this general type have been subject to certain disadvantages. The greatest disadvantage to the previous constructions resides in the fact that the free strap or web ends could be threaded into the connector in one direction only to effect a reasonably safe and secure connection and, if threaded in the opposite direction, the free end of the strap could slip from the connector upon the application of a load. In addition, the adapting connectors heretofore known were not entirely satisfactory from a slipping standpoint particularly at the heavy load frequently encountered in parachute harness use. The frictionally gripping surfaces of prior connectors abraded or cut the straps or webs which weakened them and of course lowered the margin of safety when the straps were used again. It has also been found that straps which have been previously used and stretched are apt to slip when used again with friction grip connectors.

It is an aim of the present invention to provide an adapting connector for parachute harness webbing and the like which may be quickly fitted to the harness to secure one free end of the harness webbing and which will effect a secure connection regardless of the direction in which the webbing is threaded into the connector.

It is another object of the present invention to provide a quick fit strap connector having means for clamping the free end portion of a strap and which will secure the strap end against slipping although the strap is subjected to a relatively great load.

It is a further object of the present invention to provide a quick fit adjustable connector which will wedge or clamp a strap or web in a manner which will not cause injury to the web when subjected to a great load whereby the strap or web may be repeatedly subjected to loads of equal or greater weight without slipping and without decreasing the safety factor.

A still further object of the present invention is to provide a strap connector capable of performing the foregoing objects and which is characterized by a lightweight construction and which will successfully withstand applied stresses of a higher order than any heretofore applied to similar constructions.

Other objects will be in part obvious and in part pointed out more in detail hereinafter.

The invention accordingly consists in the features of constuction, combination of elements and arrangement of parts which will be exemplified in the construction hereafter set forth and the scope of the application of which will be indicated in the appended claim.

Figure 1:
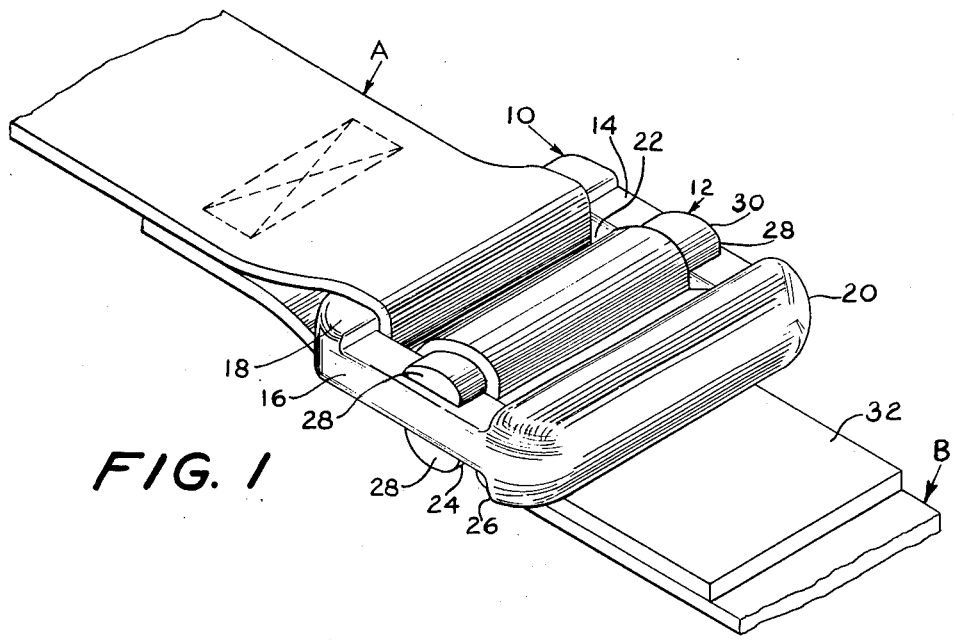
Fig. 1 is a view in perspective of a connector constructed in accordance with the present invention wherein a connection is effected between a pair of strap ends which are shown broken away.

In the present illustrative disclosure, the connector is shown in the form of a buckle wherein it is fixedly secured to one strap A and adjustably secures the free end of a second strap B. The buckle-like connector comprises generally a frame 10 which slidably supports a gripping cross bar 12. The frame 10 has integral parallel side members 14 and 16 and transversely disposed end members 18 and 20 which define a generally rectangular opening 22. The one end member 18 receives the looped end of the belt or web A which is stitched or otherwise secured in a permanent fashion to fixedly embrace the frame end 18 within its loop. It will be noted that in the specific embodiment shown in the drawings the side members 14 and 16 are generally rectangular in cross section and of substantially the same thickness, whereas the end members 18 and 20 are considerably thicker. In this way, a pair of laterally projecting strengthening portions 24 and 26 are formed on the member 20 which project equally beyond each lateral face of the side frame members and the end member 20 has an irregularly shaped cross section, a portion of which provides a gripping surface as will appear in greater detail hereinafter. The increase in thickness of end members 18 and 20 is provided merely for strengthening purposes and may be omitted, if desired, without departing from the invention.

The gripping or clamping cross bar 12 is forked or bifurcated at each of its ends to provide lateral portions 28 which loosely straddle the frame side members 14 and 16 to permit free sliding movement of the cross bar therealong. The cross bar 12 can also pivot a limited amount about its longitudinal axis relative to the side frame members due to the closely fitted bifurcated ends. However, it should be understood that the straddling legs of the lateral portions 28 overlie the side frame members 14 and 16 to such an extent that the cross bar 12 cannot be dislodged from the frame 10. Each lateral or straddling portion 28 of the cross bar 12 is symmetrical to the oppositely disposed portion and has a convex or generally cylindrical outer surface 30 over which the free end portion 32 of the strap B is looped or threaded from either lateral direction to complete the assembled relation of the straps and the connector.

Figures 2, 3:
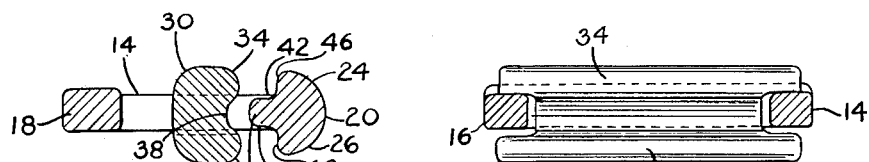
Fig. 2 is a vertical cross-sectional view taken through the connector shown in Fig. 1 and looking toward one side of the connector frame.
Fig. 3 is a vertical cross-sectional view through the connector and looking toward one end of the connector frame.
Figure 4:
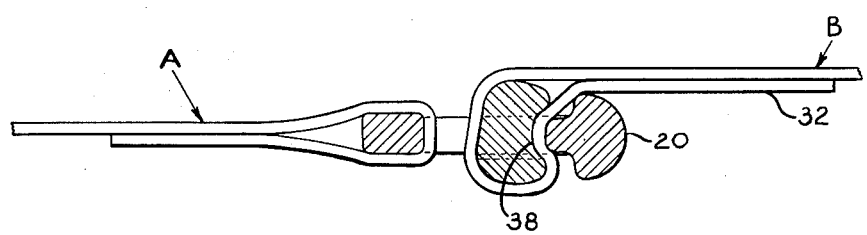
Fig. 4 is a vertical cross-sectional view similar to Fig. 2 but shown as securing two strap ends wherein the free end of one strap is threaded into the connector from a direction opposite to that shown in Fig. 1.

The lateral portions 28 have continuations thereof forming upper and lower forwardly extending ribs 34 and 36. As best viewed in Figs. 2 and 4, these ribs 34 and 36 are substantially semi-circular in cross-section and are spaced one above the other to form a concave intermediate groove 38 therebetween.

Turning now to the frame end member 20, it will be seen that this member is designed in a substantially complementary fashion to the cross bar 12 so as to cooperate therewith to wedge the free end portion of the strap B. Accordingly, the end member 20 includes a tongue or rib 40 extending in the direction of the groove 38. In the specific embodiment, the side walls 42 and 44 of the rib 40 are at substantially right angles with the side walls 46 and 48 of the lateral projections 24 and 26, thereby giving the end member 20 a T-shaped appearance when sectionally viewed, as in Figs. 2 and 4. This construction also provides the laterally projecting portions or wings 24 and 26 with rounded edges that will not damage the strap B, as would be the situation if sharp edges were formed.

It is believed that the clamping action of the connector will be readily understood from the foregoing description. Assuming that the strap B has been threadedly engaged with the connector in the manner depicted in Fig. 4, any pull on the strap B to the right will cause the cross bar 12 to be rocked in a clockwise direction, as viewed in this figure. This rocking or tilting action is barely noticeable, but may be seen upon close inspection of Fig. 4. The harder the pull, the tighter the rib 34 will clamp the strap B in the region contacted, thereby compressing the strap to less than its normal thickness, as may be noted from a careful study of Fig. 4. In other words, a tensional force applied to the running end of the strap B will cause a fulcruming of the cross bar with the attendant result that the rib 34 is moved in a direction toward the wall 42 of the rib 40, whereas rib 36 is moved in a direction away from wall 44 of the rib, the fulcruming taking place at a locus slightly above the center line of the cross bar 12 since the pull on the strap B is exerted above the center line. Of course, the exact fulcrum point will be largely influenced by the exact direction in which the pull is exerted, for the pull need not be applied in an exact horizontal direction, as assumed.

As hereinbefore alluded to, the construction envisaged by the instant invention contemplates the threading of the strap B through the connector from either side thereof. Thus, identical results are obtainable by utilizing the threading direction pictured in Fig. 1 which is opposite from that illustrated in Fig. 4. In this latter situation, referring to Fig. 1, the cross bar 12 will be tilted or rocked in a reverse direction, the rib 36 then forcing the strap tightly against the rib 40 in the direction of the wall 44.

The load capacity of the connector of the present invention greatly exceeds that of prior art devices of similar dimensions and weight. In general, the prior art devices will slip before maximum capacity load has been placed upon the straps or webbing. This is particularly true in connection with parachute harness utilizing connectors having a weight and dimensions within the limits required for connectors utilized with such equipment. With connectors of the present invention having similar weight and dimensional limitations, no slipping occurs before the breaking point of the strap or web is reached. While it is not desired to limit the present invention to any specific theory of operation, nonetheless it is believed that by reason of the abrupt change of direction imposed upon the strap or webbing at the clamping or gripping surfaces, there is caused an unexpectedly great increase in gripping action distinct from the frictional gripping of the prior art devices which completely overcomes the tendency of the strap or webbing to slip without at the same time damaging the structure of the strap or webbing.

A very great advantage of the connector of the present invention, of course, is its ability to provide an increased gripping action regardless of which of the two directions the webbing is threaded through the connector. In prior art devices requiring threading in one direction only, great care must be taken to ensure that the proper direction of threading is understood and followed by the users of the connector. As a matter of fact, in parachuting operations utilizing connectors of the prior art type, equipment and mules have become disengaged from their parachutes due to improper threading of the webbing through the connector either inadvertently or through failure of the operators to understand the limitations of the connector. It is a further advantage of the connector of the present invention that, although it will operate successfully regardless of the direction that the webbing is threaded therethrough, loosening and adjustment of the strap or webbing is not materially interfered with.

It will, of course, be appreciated that in designing a connector of this type due consideration should be given to the thickness and nature of finish of the webbing to be accommodated, the dimensions and shape of the connector being varied according to the thickness and nature of material and including the finish applied thereto.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claim is intended to cover all of the generic and specific features of the invention herein described and all statements of the scope of the invention which, as a matter of language, might be said to fall therebetween.

We claim as our invention:

An adjustable connector for harness strapping and the like comprising integral side and end frame members lying in a common plane and defining a strap receiving opening, one of said end members being substantially thicker than the other frame members so as to define an equally extending side portion beyond each end of said opening, each of said side portions having a convexly curved outer surface, said one end member having a gripping face adjacent said opening provided with a centrally disposed longitudinal rib and a gripping bar disposed within said opening, said gripping bar having bifurcated ends engaging said side members with sufficient clearance to permit relative sliding, said bifurcated ends being provided with opposed, parallel faces with either edge thereof nearest the substantially thicker end member serving as a fulcrum point and the edge diagonally opposite cooperating therewith to permit limited pivotal movement of the bar about its longitudinal axis, said bar having convexly curved outer surfaces and a gripping face opposing the gripping face of said one end member, said gripping face being provided with an intermediate longitudinal groove and a rib equally spaced to either side of said groove, said last mentioned ribs being spaced apart by said intermediate groove whereby the free end portion of a strap will be wedged between the opposed ribs and grooves of the gripping faces after the strap has been passed over the bar from either end of said opening and then between the gripping faces and after a force has been applied to the strap which causes said bar to slide toward said one end member and pivot about its own axis.

References Cited in the file of this patent

UNITED STATES PATENTS

| | | |
|---|---|---|
| 368,529 | Harris | Aug. 16, 1887 |
| 550,112 | Schneider | Nov. 19, 1895 |
| 565,868 | Washburne | Aug. 11, 1896 |
| 2,542,044 | Miller et al. | Feb. 20, 1951 |

FOREIGN PATENTS

| | | |
|---|---|---|
| 25,212 | France | Sept. 19, 1922 |
| | (1st addition to No. 504,129) | |